US008919530B2

(12) United States Patent
Schreiber et al.

(10) Patent No.: US 8,919,530 B2
(45) Date of Patent: Dec. 30, 2014

(54) SHORT GAP DIVERTER

(71) Applicant: Machine Solution Providers, Inc., Downers Grove, IL (US)

(72) Inventors: Joseph M. Schreiber, Woodridge, IL (US); Arne Roy Jorgensen, Lombard, IL (US)

(73) Assignee: Machine Solution Providers, Inc., Downers Grove, IL (US)

( * ) Notice: Subject to any disclaimer, the term of this patent is extended or adjusted under 35 U.S.C. 154(b) by 0 days.

(21) Appl. No.: 13/857,636

(22) Filed: Apr. 5, 2013

(65) Prior Publication Data

US 2014/0305768 A1   Oct. 16, 2014

Related U.S. Application Data

(60) Provisional application No. 61/623,983, filed on Apr. 13, 2012.

(51) Int. Cl.
*B65G 47/10* (2006.01)
*B65G 47/64* (2006.01)

(52) U.S. Cl.
CPC .................................. *B65G 47/647* (2013.01)
USPC .......................................... 198/367; 198/442

(58) Field of Classification Search
CPC ........ B65G 47/66; B65G 47/68; B65G 47/71; B65H 29/58; B65H 29/60; B65H 29/62
USPC .......... 198/367, 435, 436, 442; 271/302, 303, 271/312, 313; 209/657
See application file for complete search history.

(56) References Cited

U.S. PATENT DOCUMENTS

| 2,375,241 | A | * | 5/1945 | Lindgren et al. | ............ 414/791.1 |
| 3,093,236 | A | * | 6/1963 | McLaughlin | ............ 198/370.08 |
| 6,131,720 | A | * | 10/2000 | Heuft et al. | .................... 198/367 |
| 6,575,288 | B2 | * | 6/2003 | Bartels et al. | .................. 198/438 |

FOREIGN PATENT DOCUMENTS

| DE | 4132811 A1 | * | 4/1993 | ............ B65G 47/64 |
| GB | 1594810 A | * | 8/1981 | |

* cited by examiner

*Primary Examiner* — William R Harp
(74) *Attorney, Agent, or Firm* — Law Offices of John W. Harbst

(57) ABSTRACT

A short gap diverter for a conveyor includes a plurality of spaced apart belts for transferring a product from a speed up conveyor to a primary delivery conveyor. A secondary delivery conveyor is positioned above the transit conveyor. A first set of fingers is positioned between the belts and is moveable from a position below the plane determined by the upper surfaces of the belts to a second position above the plane and angled toward the secondary delivery conveyor. A second set of fingers is mounted on the secondary delivery conveyor and moveable from a first retracted position to an extended position with the extended fingers forming a bridge for directing alternate products to the secondary delivery conveyor.

12 Claims, 18 Drawing Sheets

SHORT GAP DIVERTER

Applicant Schreiber claims priority from his provisional application filed on Apr. 13, 2012 and assigned Ser. No. 61/623,983. The present application relates to assembly line diverters that divert every other product on a conveyer to a second conveyer wherein both the first and second conveyers feed packaging stations, and in particular to a short gap diverter that requires a minimum spacing between products to initiate a diversion.

BACKGROUND OF THE INVENTION

The manufacture of certain products, such as roof shingles, or other generally planar products, include a conveyor that moves the product, such as a length of material, through various manufacturing stages. In the case of manufacturing roofing shingles, a felt strip is treated and adhesive material and granulated particles are applied thereto. The elongate strip eventually passes through a cutter to cut the felt material into standard lengths after which a delivery conveyor transfers the cut shingles to a packaging station. The manufacturing cost for such shingles can be minimized by increasing the conveyor speed. The limiting factor for conveyor speed, in many such manufacturing processes, is at the packaging end where the fast moving product on a delivery conveyor must be stopped and stacked for packaging. Where the speed of the delivery conveyor is very high and the moving product is stopped in a short distance, the product may be damaged during the packaging operation.

One method of increasing conveyor speed is to divert every other product on the conveyer to a second packaging station. Conceptually, the provision of two packaging stations permits the conveyor speed to be doubled, without altering the product speed at the packaging station. Providing two packaging stations, however, required a diverter in which every other product on the conveyor is diverted to a secondary delivery conveyor that leads to a secondary packaging station. Usually, the secondary delivery conveyor is positioned above or below the primary delivery conveyor and the diverter diverts every other product either upwardly or downwardly to the secondary delivery conveyor.

A speed up conveyor usually follows the cutter to provide a gap between the cut products, and the diverter follows the speed up conveyor. In one form of prior art diverters, a gap is provided at the end of the speed up conveyor and before the beginning of the primary delivery conveyor leading to the primary packaging station. The belts move with sufficient speed to provide enough kinetic energy to the product to cause it to span the gap from the speed up conveyor to the primary delivery conveyor and every other product is allowed to span the gap. The diverter includes a wheel that is pivoted downward from above into the gap that nudges every other product to the secondary delivery conveyor below the primary delivery conveyor thereby diverting every other product.

In another prior art diverter positioned after a speed up conveyor includes a plurality of spaced apart belts. A plurality of moveable ramps are intermittently projected between the belts and intercept every other product moving across the spaced apart belts. When the ramps are projected between the belts, the succeeding product is moved upwardly along the ramp to a secondary delivery conveyor positioned above the primary delivery conveyor. When the ramps are withdrawn, the alternate product is moved to the primary stacking station.

Although the diverter makes possible the use of a secondary packaging station, the diverter mechanism requires time to operate and as a result products that are to be separated by the diverter must be sufficiently spaced on the conveyor to permit the diversion mechanism to be moved in place before the arrival of the next product. In order to provide the desired spacing between products, it is often necessary to provide a series of speed up conveyors. The provision of accelerating conveyors, however, increases the space requirements of the conveyors and increases the product speed that must be decelerated prior to packaging. It is desirable, therefore, that the diverter require a minimum amount of spacing between adjacent products to thereby require a minimum increase in product speed and a minimum lengthening of the conveyor.

It is common to use servo motors in diverters because of the accuracy with which they can be controlled and the rapidity of their movements. Even so, existing diverters require that the diversion elements, such as ramped surfaces or wheels that redirect a moving product from a primary delivery conveyor to a secondary line be moved into place after the trailing edge of a first product has passed and prior to the arrival of a leading edge of the next product. Similarly, after a second product has been diverted to a secondary delivery conveyor, the ramps or wheels that diverted the second product must be removed from position after the trailing end of the second product has passed and before the leading edge of the third product arrives. The time required to insert or remove a diversion element is short; however it significantly increases the gap required between two successive products. It would be desirable therefore, to provide a short gap diverter for which no time would be required to inject the diverting elements following the passage of the trailing edge of a first product and prior to the arrival of the leading edge of a second product onto the diverting device. In such a case, the gap between successive products need not be any longer than the length of the working parts of the diverter.

SUMMARY OF THE INVENTION

Briefly, the present invention disclosure is embodied in a short gap diverter for a conveyor system conveying a product having a leading edge and a trailing edge. In one form, the conveyor includes an input conveyor, and an output conveyor positioned above the input conveyor. In a preferred form, the input conveyor includes a primary delivery conveyor and a transit conveyor. The transit conveyor leads to a packaging station.

In accordance with the invention disclosure, the upper surface of the input conveyor defines a first plane and the upper surface of the upper output conveyor defines a second plane that is angled at a first angle with respect to the first plane and intersects the first plane. It is desirable that the first angle between the first and second planes defines a small angle, preferably between ten and fifteen degrees.

The invention disclosure further requires a moveable first finger having a length, an outer end, and an upper surface. The first moveable finger is preferably and operably arranged between upstream and downstream ends of the input conveyor between two parallel belts thereof. The upper surface of the finger is longitudinally movable along a path of travel extending generally parallel to the second plane. The outer end of the first finger is moveable between a retracted position, below the upper surface of the input conveyor (the first plane), and an extended position. During movement of the finger, the outer end of the finger penetrates the first plane and moves upward to a second position above the first plane. Accordingly, the outer end of the first finger advances through the first plane as it moves between the first position and the second position.

The diverter of the present invention disclosure further includes a motor for moving the first finger between the first and second positions and a detector for detecting the position of one of the trailing edge of a first product with respect to the input conveyor and a leading edge of a second product on the input conveyor. A synchronizing device is also provided that is connected to the motor and to the detector for initializing the advancement of the first finger from its first position toward the second position prior to the arrival of the leading edge of the second product at the intersection of the first and second planes. In the preferred embodiment, the outer end of the finger will reach the intersection between the first and second planes simultaneously with the leading edge of the second product, with the first finger preferably moving at the same speed as the second product In another aspect of the present invention disclosure, a second finger is provided having a length, an outer end, and an upper surface. The upper surface of the second finger is disposed at an angle substantially equivalent to but preferably not greater than the first angle and is arranged in generally coplanar relation relative to the second plane. The second finger is mounted on the leading end of the output conveyor and is longitudinally moveable downwardly along a path of travel extending generally parallel to the second plane toward and away from the first finger. The second finger is moveable between a first position, wherein the outer end of the second finger is spaced above the first plane, and a second position, wherein the outer end of the second finger is below the first position but above the first plane. A second motor is provided for moving the second finger between its first and second positions and the synchronizing device is connected to the second motor such that the second finger reaches its second position when the first finger reaches its second position. In a preferred embodiment, and when the second finger reaches its second position, the outer end of the second finger is in near proximity to the outer end of the first finger, when the first finger is in its second position. Accordingly, a second product on the input conveyor reaching the intersection of the first and second planes is directed upwardly by the first finger and is guided to the second finger, thereby diverting the second product to the output conveyor. Accordingly, a second product arriving on the input conveyor is directed by the first finger into the third plane and guided to the second finger, thereby diverting the second product to the secondary delivery conveyor.

In one aspect of the invention, the second angle is equal to the first angle such that the second and third planes are congruent.

BRIEF DESCRIPTION OF THE DRAWINGS

A better understanding of the invention will be had after a reading of the following detailed description taken in conjunction with the drawings, wherein.

DETAILED DESCRIPTION OF PREFERRED EMBODIMENT

Figure 1:
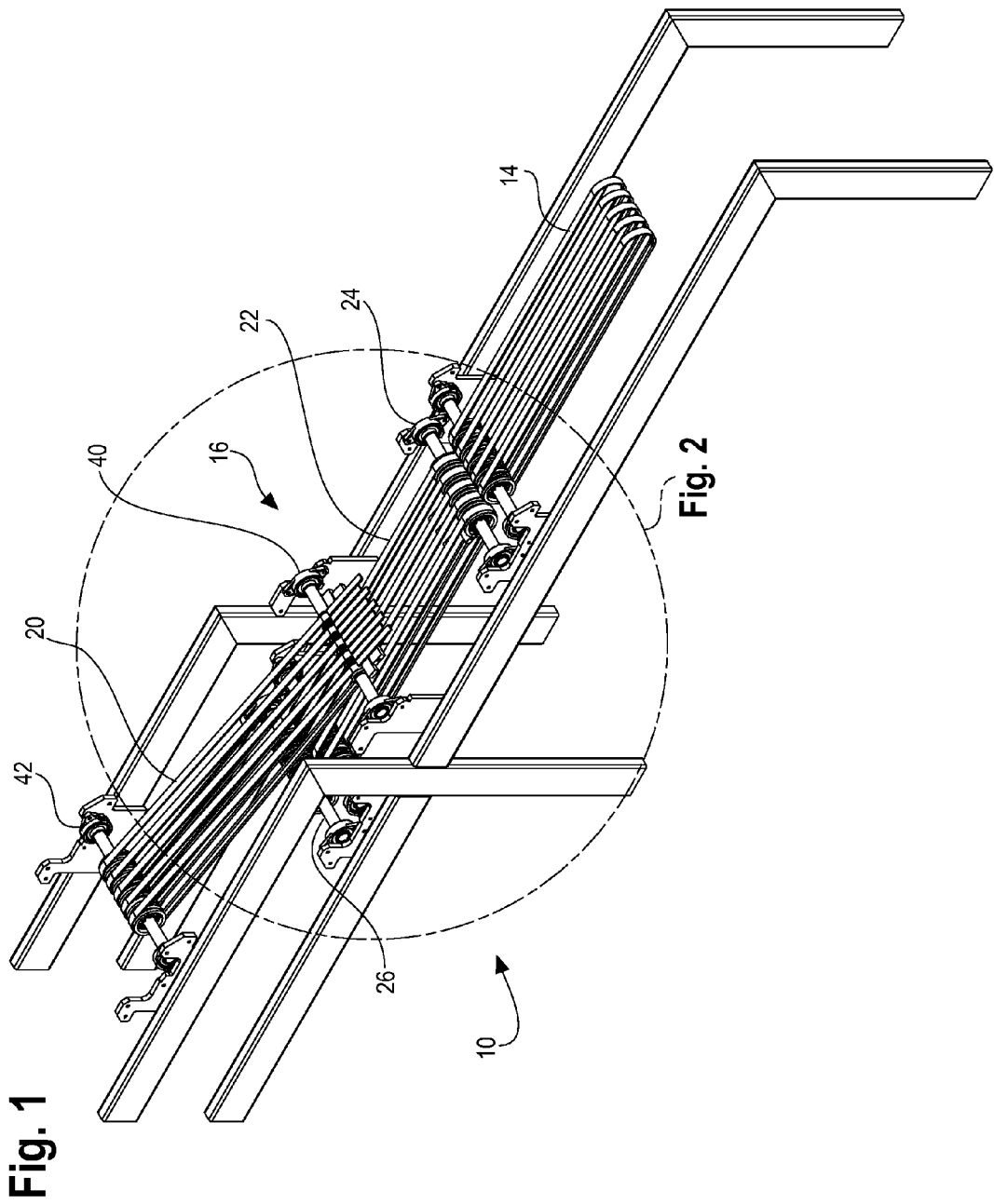
FIG. 1 is an isometric view of a conveyor system including a diverter in accordance with the present invention.
Figure 2:
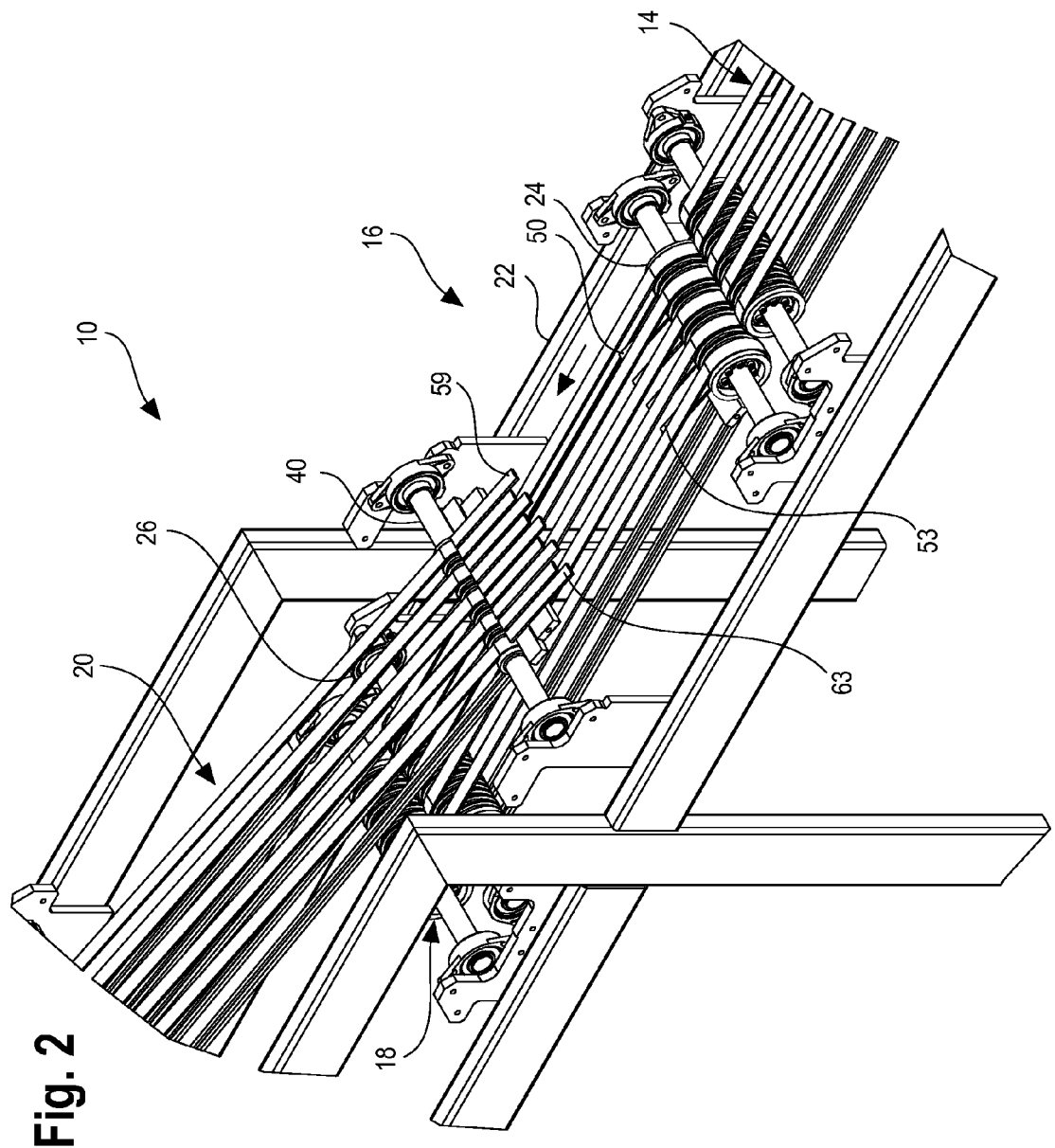
FIG. 2 is a fragmentary enlargement of the conveyor and diverter shown in FIG. 1 with the first and second sets of fingers in their retracted first positions.

Referring to FIGS. 1 through 5, near the end of a manufacturing process for a generally planar product such as roofing shingles and the like, the substantially completed product moves along the upper surface of a conveyor to a cutter, not shown, that divides the elongate member into individual shingles or products 12. After the cutter, the products move to one or more packaging stations, not shown. To increase the speed at which the conveyor 10 operates, two packaging stations are provided. In order to accommodate two packaging stations, a speedup conveyor may be provided after the cutter to provide a gap between adjacent products 12. Regardless of the need for a speed up conveyor, following the cutter an input conveyor 14 carries the product 12 to a diverter 16, and following the diverter 16 is the primary delivery conveyer 18 that leads to the first packaging station. Positioned immediately above the primary delivery conveyor 18 is a secondary delivery conveyor 20, and between the input conveyor 14 and the primary and secondary delivery conveyors 18, 20 is a transit conveyor 22 that forms a central portion of the diverter 16. Although the transit conveyor 22 is depicted as being separate from the primary delivery conveyor 18, the first section of the primary delivery conveyor 18 may also serve as the transit conveyor 22.

The transit conveyor 22 includes first and second rotating drums 24, 26 around which are fitted a plurality of spaced apart belts 28, 29, 30, 31, 32 with the upper surfaces of the belts 18-32 defining a plane 33. The upper surface of the input conveyor 14 and the upper surface of the primary delivery conveyor 18 may also fall within plane 33, but that is not necessary for the invention. For the purpose of this description however, the parts are depicted as being coplanar, such that undiverted products 12 moving along the plane 33 on the input conveyor 14 to the transit conveyor 22 and then to the primary delivery conveyor 18.

Figure 3:
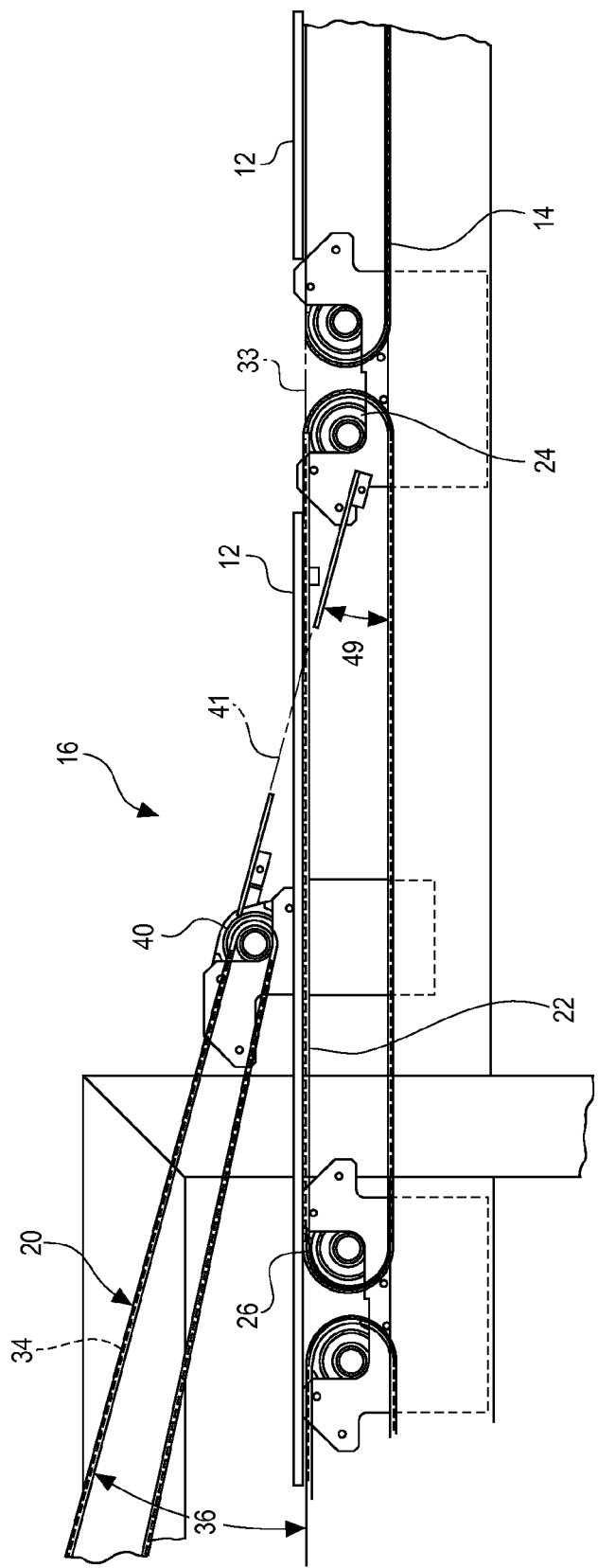
FIG. 3 is a side view of the conveyor and diverter shown in FIGS. 1 and 2.

As shown in FIG. 3, the first section 20 of the secondary delivery conveyor is positioned at an angle 36 with respect to the first plane 33 such that the upper surface of section 20 defines a second plane 34 positioned at angle 36 with the first plane 33 that is preferably between ten and twenty degrees.

Figure 4:
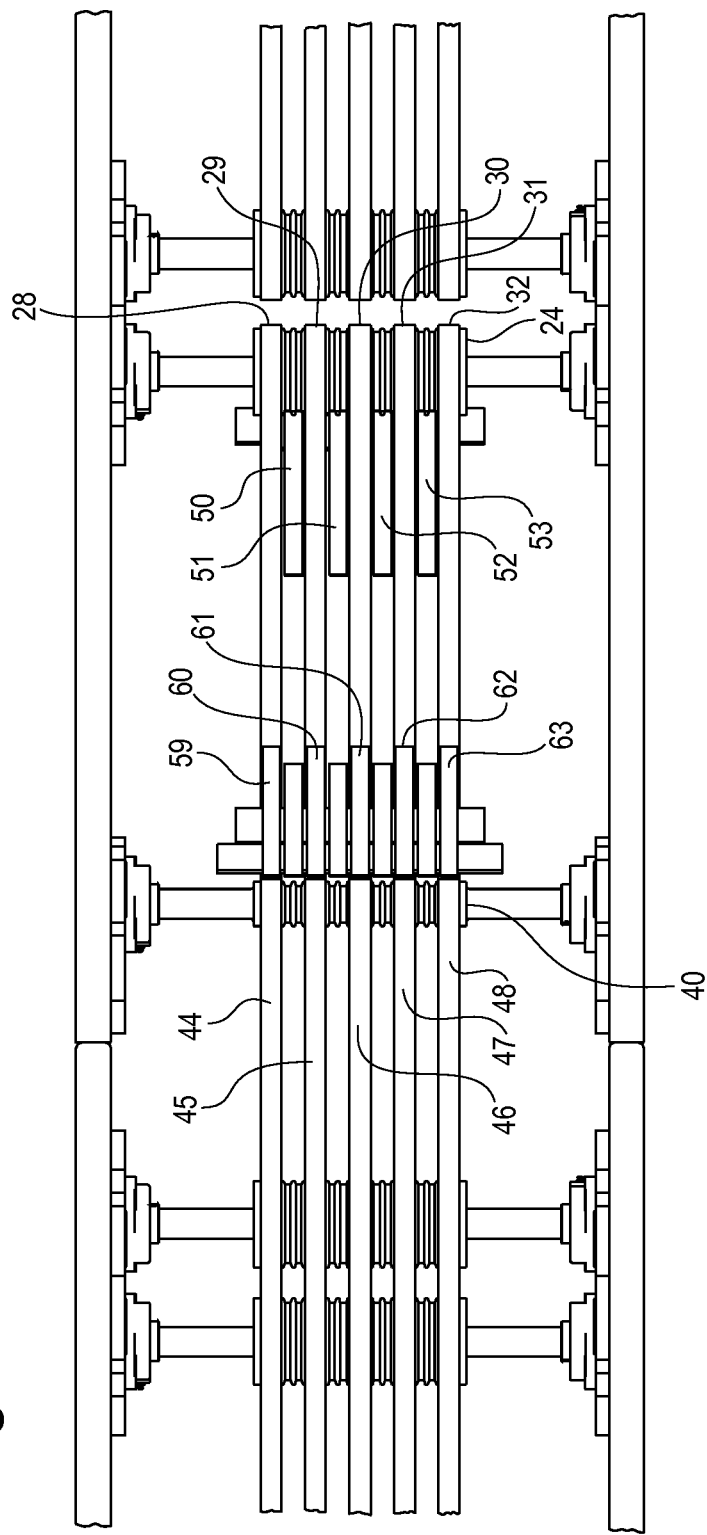
FIG. 4 is a top view of the conveyor and diverter shown in FIGS. 1 and 2 showing the first and second fingers in their retracted first positions.

As shown in FIGS. 1 and 4, the first section 20 of the secondary delivery conveyer has first and second rotating drums 40, 42 around which are positioned a plurality of spaced apart belts 44, 45, 46, 47 48. The upper surfaces of the belts 44-48 define the plane 34 of section 20 of the secondary conveyor.

Even for relatively planar products, such as sheets of shingles, the movement of the product 12 on the surface of a conveyor will cause agitation of the product as it moves and therefore a minimum spacing is required between the upper surface of the conveyor belt and any object that is positioned above the conveyor including the lower portions of the secondary delivery conveyor 20. Accordingly, the lower portions of the secondary delivery conveyor 20 must be a minimum height above the upper surface of the transit conveyor 22. A diverter 16 must guide a moving product 12 under that minimum height above the transit conveyor 22 as it moves from the surface of the transit conveyor 22 until it is taken up by the secondary delivery conveyor 20.

Figure 5:
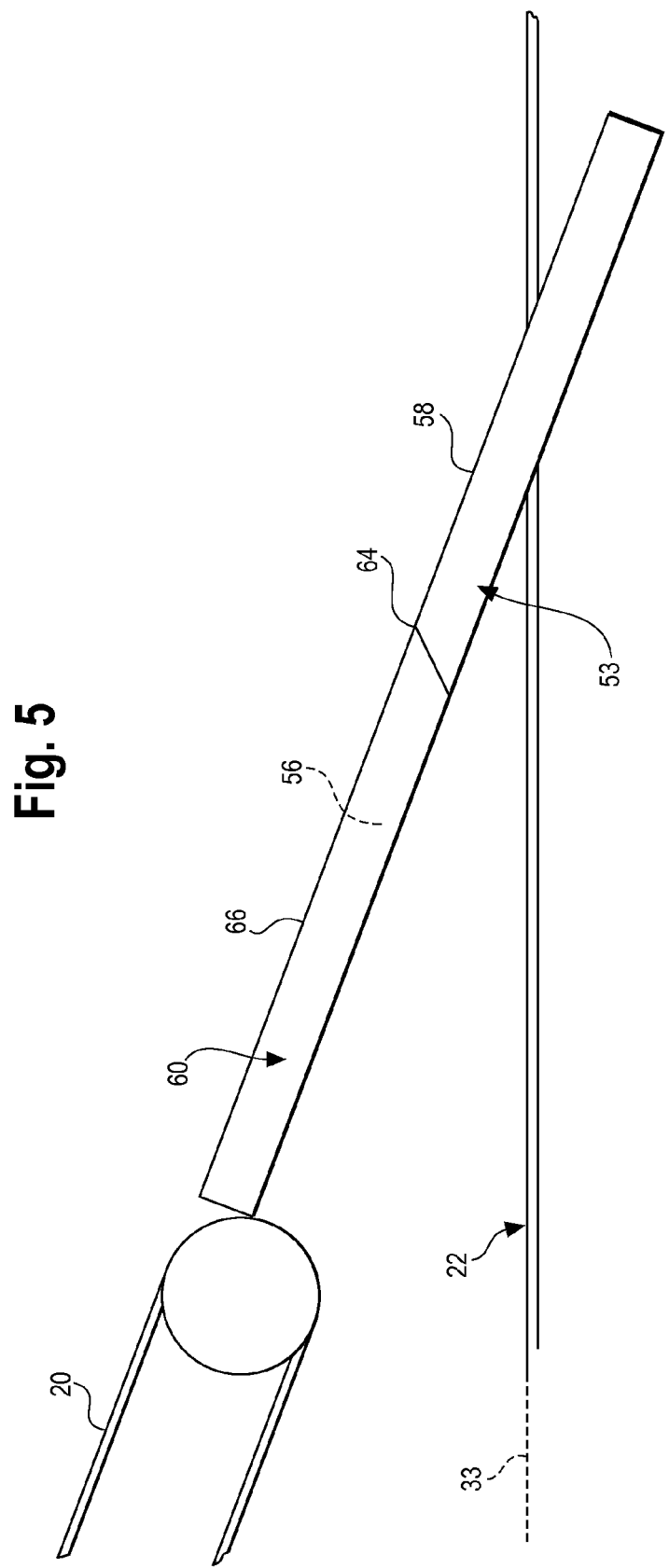
FIG. 5 is a fragmentary side elevational view of the first and second fingers in the diverter shown in their extended position.

As further shown in FIGS. 3 and 4, mounted between the belts 28-32 of the transit conveyor 22 are a plurality of elongate first fingers 50, 51, 52, 53 of which finger 50 depicted in FIG. 5 is representative of all. Specifically, each finger 50 has an elongate body and an outer end 56 with an upper surface 58. As shown, the upper surface 58 of the fingers 50, 51, 52 and 53 are arranged in generally coplanar relation relative to each other and combine with each other to define a plane 41 oriented at an angle 49 to the first plane 33 where angle 49 is no greater than angle 36, and, in a preferred embodiment, is disposed at the same angle relative plane 33 as is angle 36, It is not necessary that angle 49 be equal to angle 36 but, in many circumstances, it is beneficial that the two angles 36 and 49 be equal, thereby enabling the plane 41 to be congruent with plane 34 formed by the upper surfaces of the belts 44-48 of the secondary delivery conveyor 20. Where the two angles are equal, each finger 50 is longitudinally moveable in a direction parallel to the length of the belts 44-48 with the upper surface 58 of the finger being moveable in the planes 34, 41. The fingers 50-53 are longitudinally moveable from a first position, shown in FIGS. 2, 3 and 4, to a second position, shown in FIG. 9, by a motor 57, which is preferably a linear servo motor, shown only in FIG. 6.

Referring to FIGS. 1-5 and 9, the device further includes a plurality of second fingers 59, 60, 61, 62, 63 each of which is aligned as an extension to one of the spaced apart belts 44, 45, 46, 47, 48 of the secondary delivery conveyor 20. Each of the second fingers 59, 60, 61, 62, 63 are identical to each other such that finger 60 depicted in FIG. 5 is representative of all five. Each finger 60 has an outer end 64 and a generally planar upper surface 66 that moves within the plane 34 defined by the upper surfaces of belts 44-48. Each of the fingers 59-63 is longitudinally moveable from a retracted position, shown in FIGS. 3 and 4 to an extended position shown in FIG. 9. When the first and second fingers 50-53, 59-63 are all in their extended position, the outer ends 56 of the first fingers 50-53 will slide between the outer ends 64 of the second fingers 59-63 thereby forming a bridge spanning the distance between the upper surface of the transit conveyor 22 and the secondary delivery conveyor 20. All the second fingers 59, 60, 61, 62, 63 are simultaneously moveable by a second motor 68, shown only in FIG. 6, which is preferably a linear servo motor.

Figure 6:
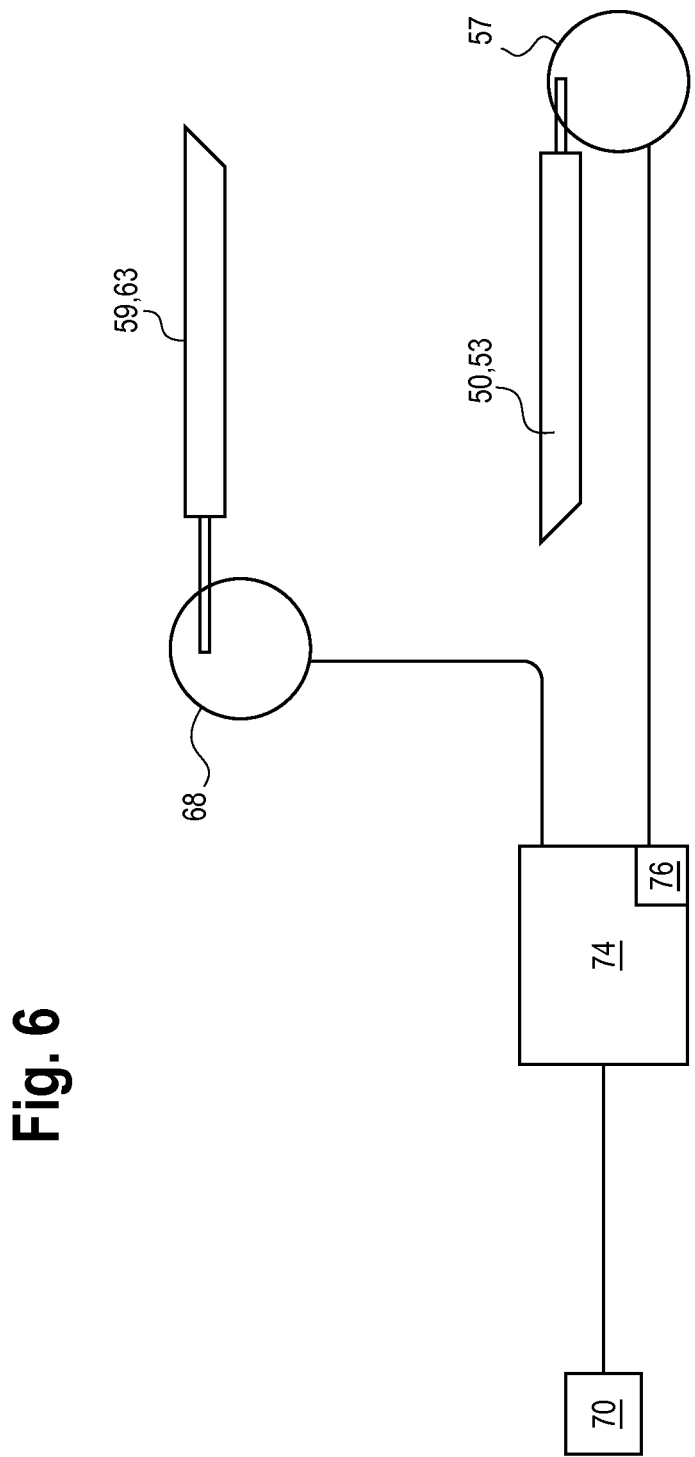
FIG. 6 is a schematic view of the operating parts of the diverter.

Referring to FIG. 6, the device further includes a detector 70 for detecting the presence of a trailing edge of a first product 12 preferably before it passes the intersection of the first plane 33 and the third plane 41 (which may also be plane 34) and detecting the arrival of the leading edge of a second product 12 before it reaches the intersection of the first and third planes 33, 41. The device includes a synchronizing device 74, which may be in the form of a computer, and includes a clock 76 for measuring the time between the trailing edge of a first product and the leading edge of a second product to thereby determine the length of the gap between adjacent products. The synchronizing device 74 is connected to the first and second motors 57, 68 for controlling the motors and synchronizing their movement with respect to the movements of the product 12 along the conveyor 10.

Figure 7:
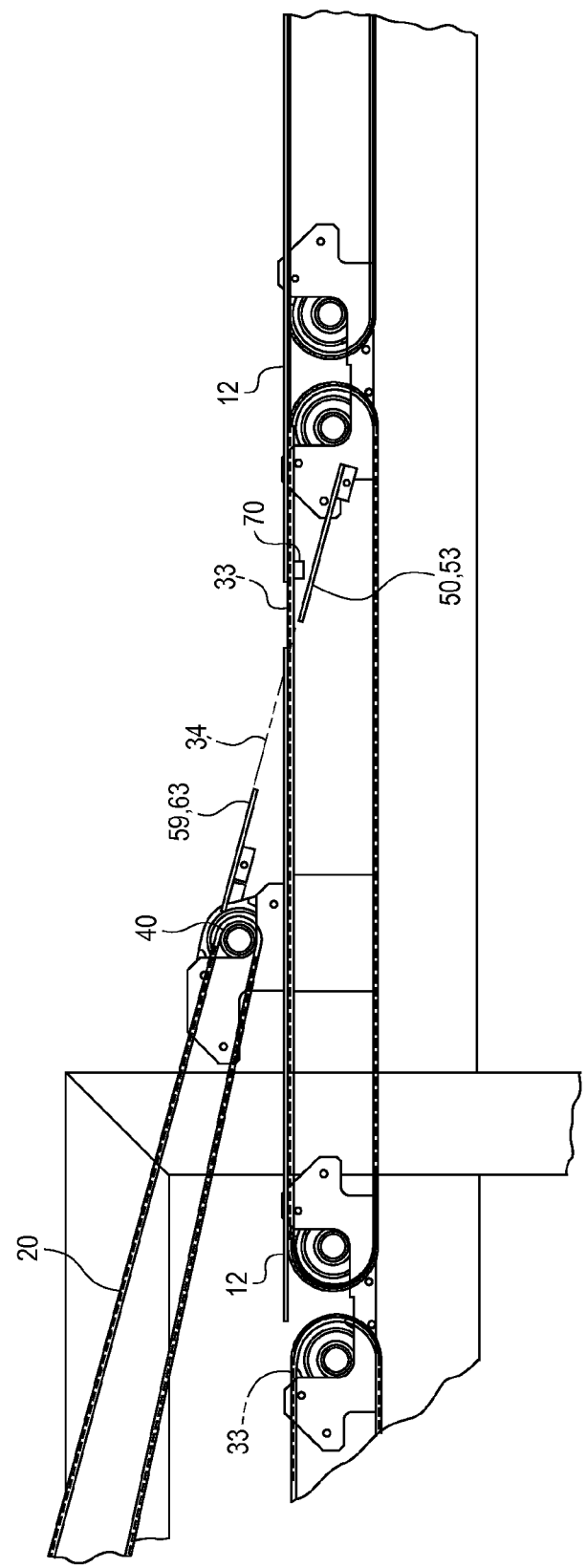
FIG. 7 is a schematic view of the diverter showing the position of the first and second fingers in their retracted positions as the trailing end of a first product crosses the intersection of the planes formed by the delivery conveyors.

Referring to FIG. 7 which depicts the trailing edge of a product 12 crossing the intersection of the planes 33, 41 and the leading edge of a second product 12 is approaching the intersection of the two planes. At this portion of the cycle both the first fingers 50-53 and the second fingers 59-63 are fully withdrawn and not in motion, but the detector 70 has detected the approach of the leading edge of the second product 12. The logic 76 then energizes the first motors 57 to begin the outward acceleration of the first fingers 50-53 from their first position toward their second position.

Figure 8:
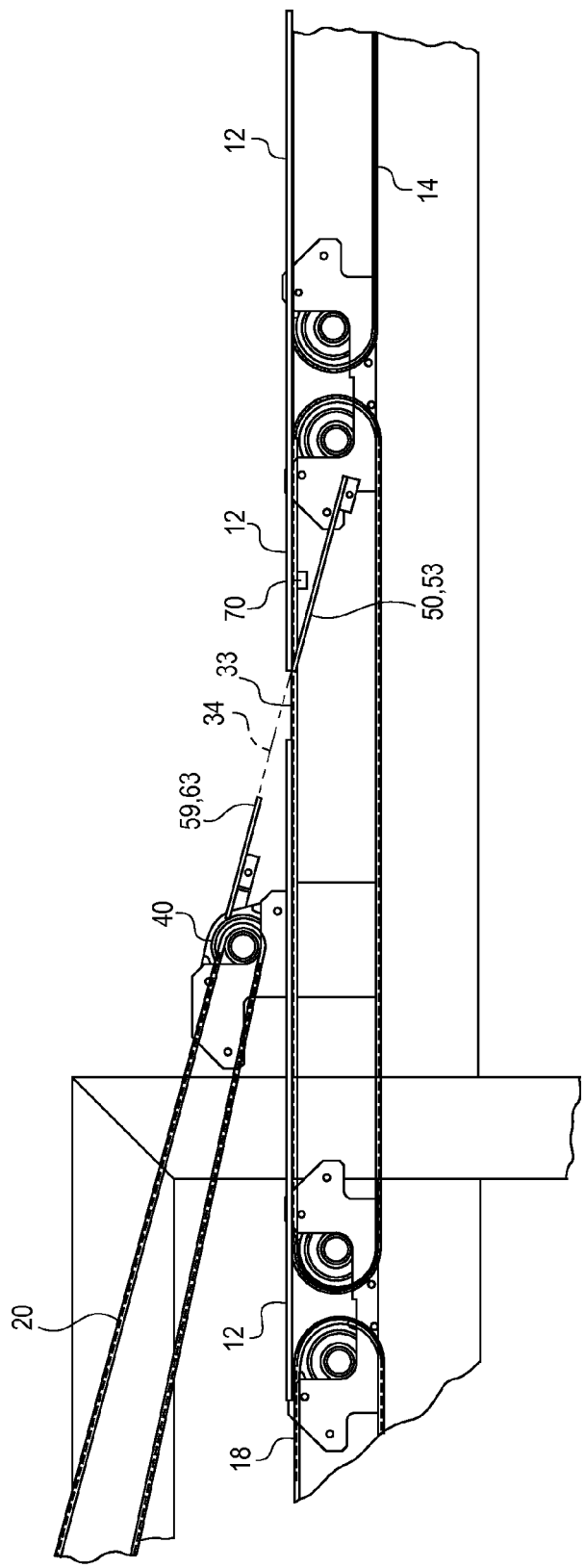
FIG. 8 is a second schematic view showing the positions of the first and second fingers after the trailing edge of the first product has passed through the intersection of the first and second planes and the leading edge of the second product reaches the intersection of the planes.

Referring to FIG. 8 in which the leading end of the second product member 12 has reached the intersection of the planes 33, 41 and the first fingers 50-53 have accelerated until they have reached a speed equal to the speed of the leading end of the second product 12 causing the first fingers 50-53 to move with the forward edge of the second product 12 and divert it upwardly. Also at this time, the logic 76 energizes the second motors 68 to advance the second fingers 59-63 from their first position toward their second position.

It is important that the outer ends 56 of the first fingers 50-53 reach the intersection of planes 33 and 41 on conveyor 22 just as the leading end of the next product 12 reaches the intersection. It is also important that the longitudinal speed of the first fingers 50-53 be equal to the longitudinal speed of the product 12 as it reaches the intersection with plane 41 so that the outer ends of fingers 50-53 will direct movement of the product 12 upward toward the secondary conveyor 20. As can be seen, the leading edge of the product 12 is then directed upward immediately after the trailing edge of the preceding product 12 has passed through the intersection of planes 33 and 41 and little or no space is needed between successive products 12 as they move along conveyor 14.

Figure 9:
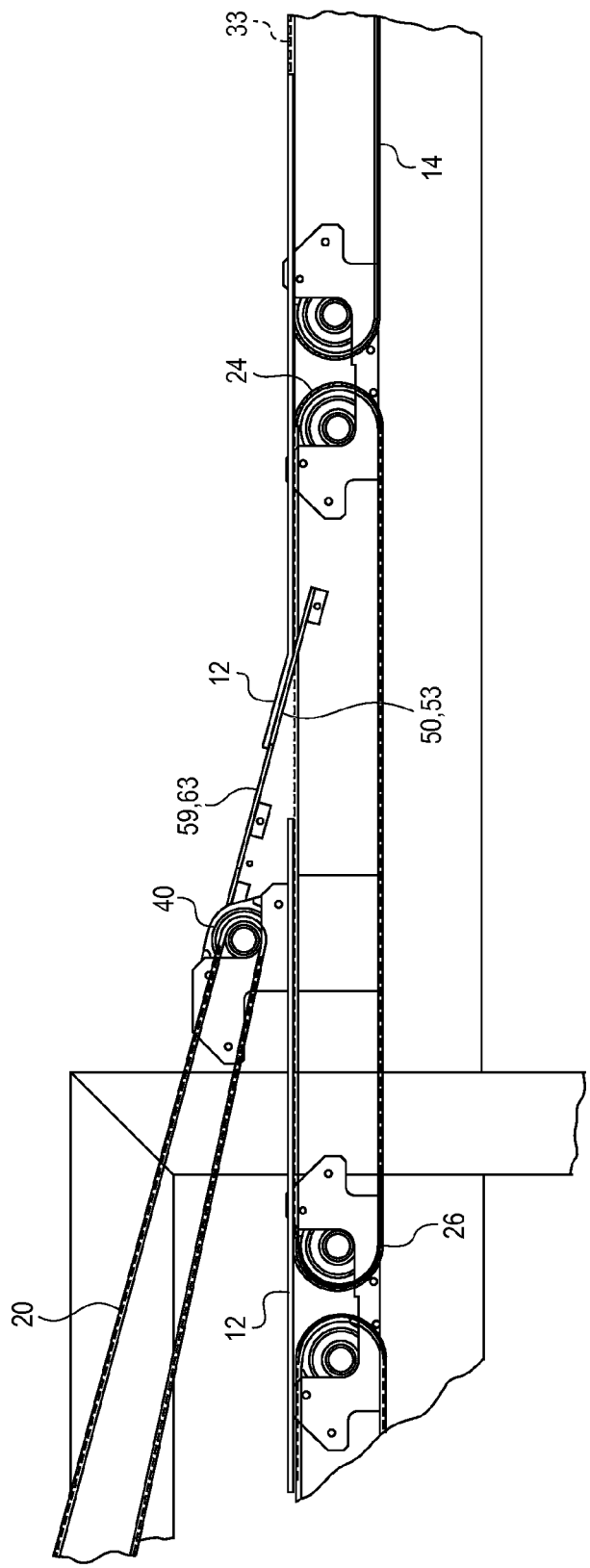
FIG. 9 is a third schematic view showing the position of the first and second fingers as the second product moves across the diverter and moves along the first fingers toward the secondary conveyor.

Referring to FIG. 9 in which the leading end of the second product member 12 has moved upwards and the outer ends of the first fingers 50-53 are fully extended and the second fingers 59-63 have begun moving downwardly such that the two sets of fingers form a bridge. The second product member 12 can therefore move across the bridge formed by the first and second sets of fingers towards the second delivery conveyor 20.

Figure 10:
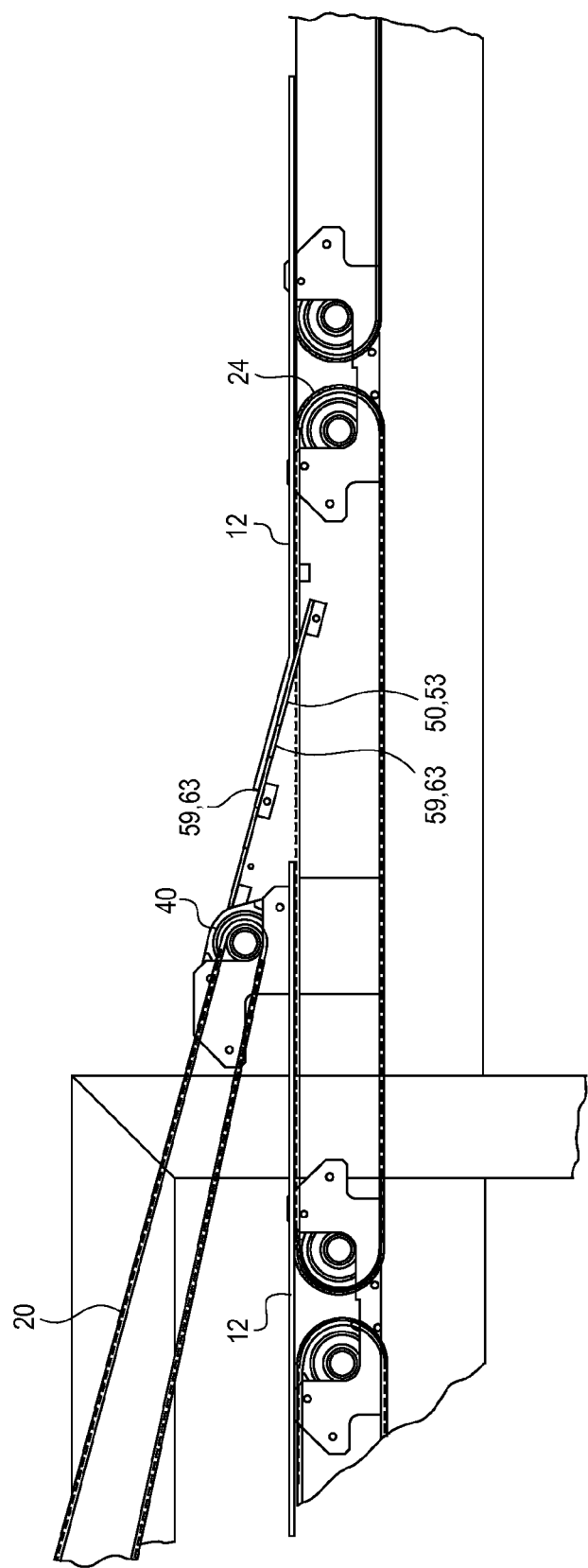
FIG. 10 is another schematic view showing the product advancing across the bridge formed by the fingers.

Referring to FIG. 10 in which the second product member 12 is depicted as moving across the bridge formed by the first and second fingers towards the second delivery conveyor 20. The first fingers 50-53 dwell for a short time at their second position and then begin accelerating from their second position back towards their first position. In the meantime, the second fingers 59-63 have begun decelerating as they approach their second position.

Figure 11:
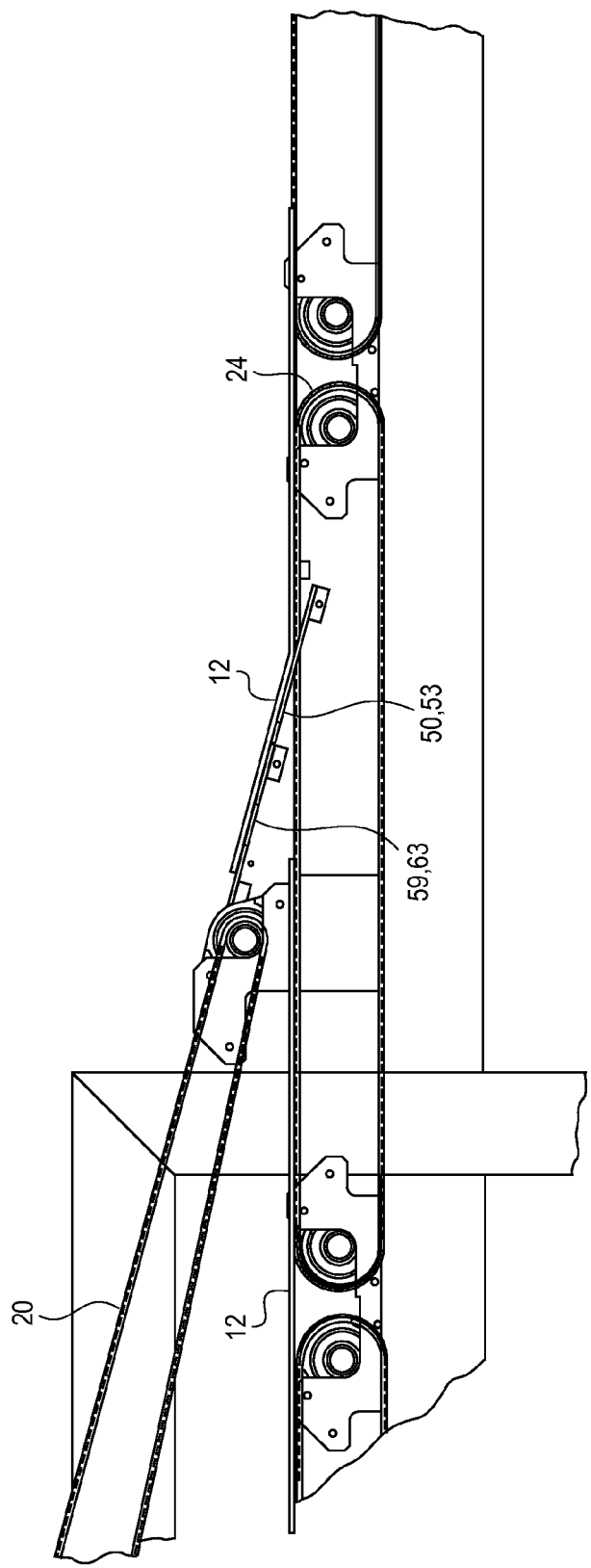
FIG. 11 is another schematic view showing the leading end of the product reaching the secondary deliver conveyer.

Referring to FIG. 11 in which the leading end of the second product 12 is depicted as approaching the end of the bridge formed by the first and second sets of fingers. In this position, the first set of fingers 50-53 are accelerating toward their first position and the second set of fingers 59-63 have reached their fully extended second position where they will remain at rest for an interval of time and will thereby continue guiding the lengths of the product 12 towards the second delivery conveyor 20.

Figure 12:
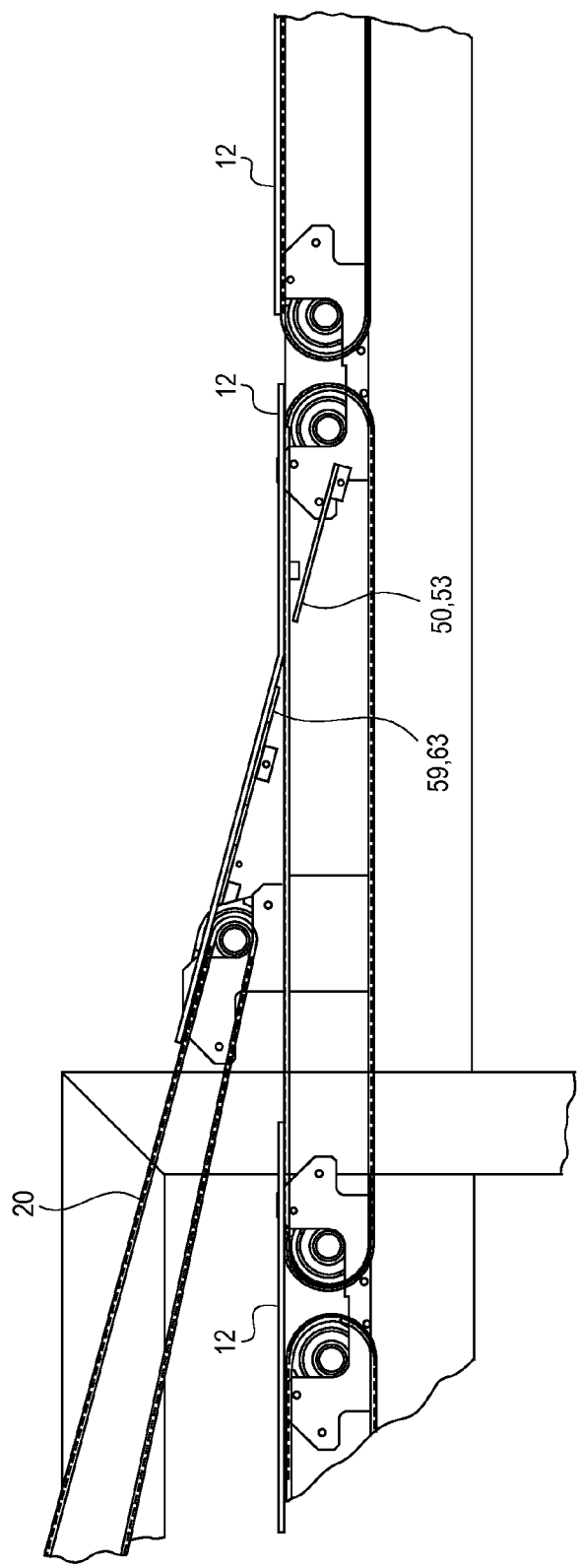
FIG. 12 is another schematic view showing the retraction of the first fingers as the product continues to advance onto the secondary deliver conveyor.

Referring to FIG. 12 in which more than half of the second product 12 is depicted as moving upward on the fully extended second set of fingers 59-63 and the first set of fingers 50-53 have withdrawn to their first position below the intersection of the planes 33, 41. When in this position, the remainder of the second product member 12 will be guided to the second delivery conveyor 20 solely by the extended second fingers 59-63. It is important that the outer ends 56 of the first fingers 50-53 be withdrawn below the intersection of the planes 33 and 41 before the next product 12 reaches this intersection so as not to interfere with the movement of the next product 12 to the primary delivery conveyor 18.

Figure 13:
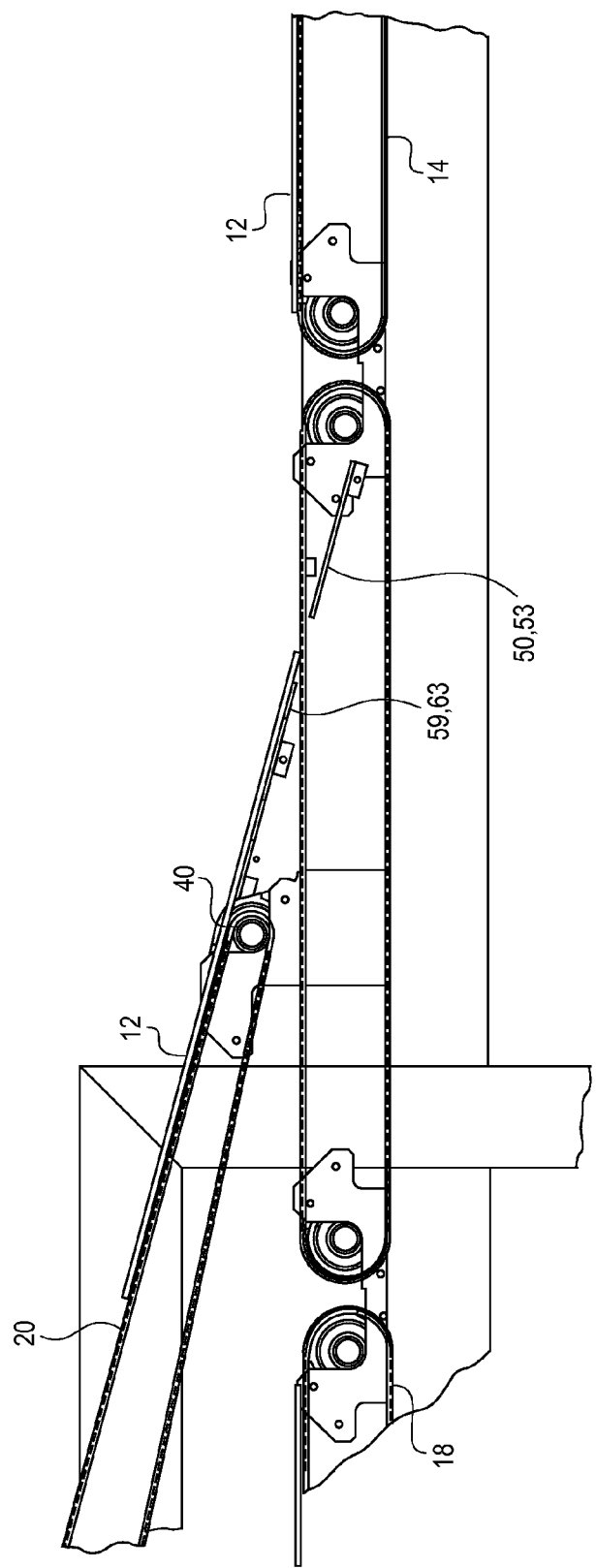
FIG. 13 is another schematic view showing the position of the fingers immediately after the trailing edge of the second product has passed through the intersection of the upper and lower planes and the leading edge of a third product approaches the intersection.

Referring to FIG. 13 in which the trailing end of the second product member 20 is depicted as reaching the intersection of the first and second planes 33, 41. At this position, the detector 70 has detected the trailing edge of the second product 12 and the logic 76 has directed power to the second motor to begin retraction of the second fingers from their second position towards their first position. The first fingers 50-53 remain at rest for an additional moment until the detector 70 detects the approach of the leading edge of a third product member 12.

Figure 14:
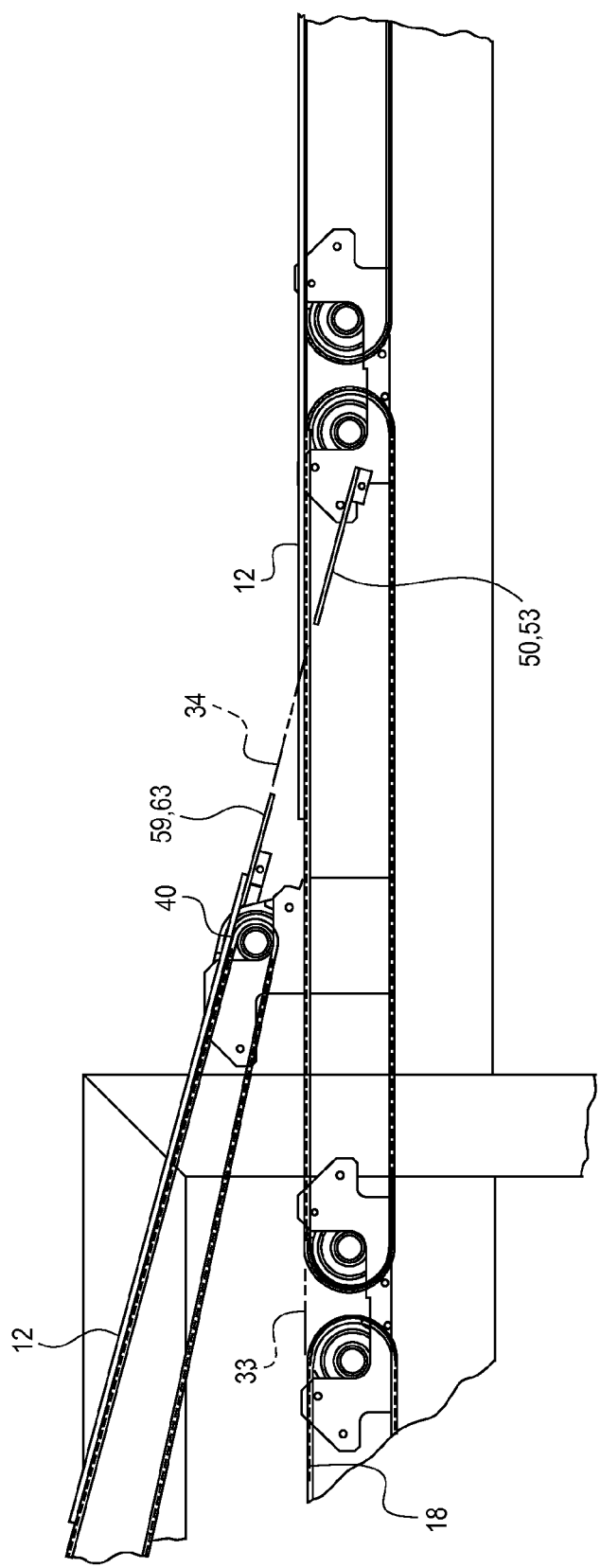
FIG. 14 is another schematic view showing the third product crossing the transit conveyor to the primary delivery conveyor.

Referring to FIG. 14 in which the third product member is moving across the transit conveyor 22 towards the primary delivery conveyor 18. While the third product member 12 is moving across the transit conveyor 22, both the first and second sets of fingers remain in their retracted first position so as not to interrupt the movement of the third product member. At the time the trailing end of the third product member 12 is detected by detector 70, the logic 76 will again initiate movement of the first fingers 50-53 and the cycle will be repeated.

Figure 15:
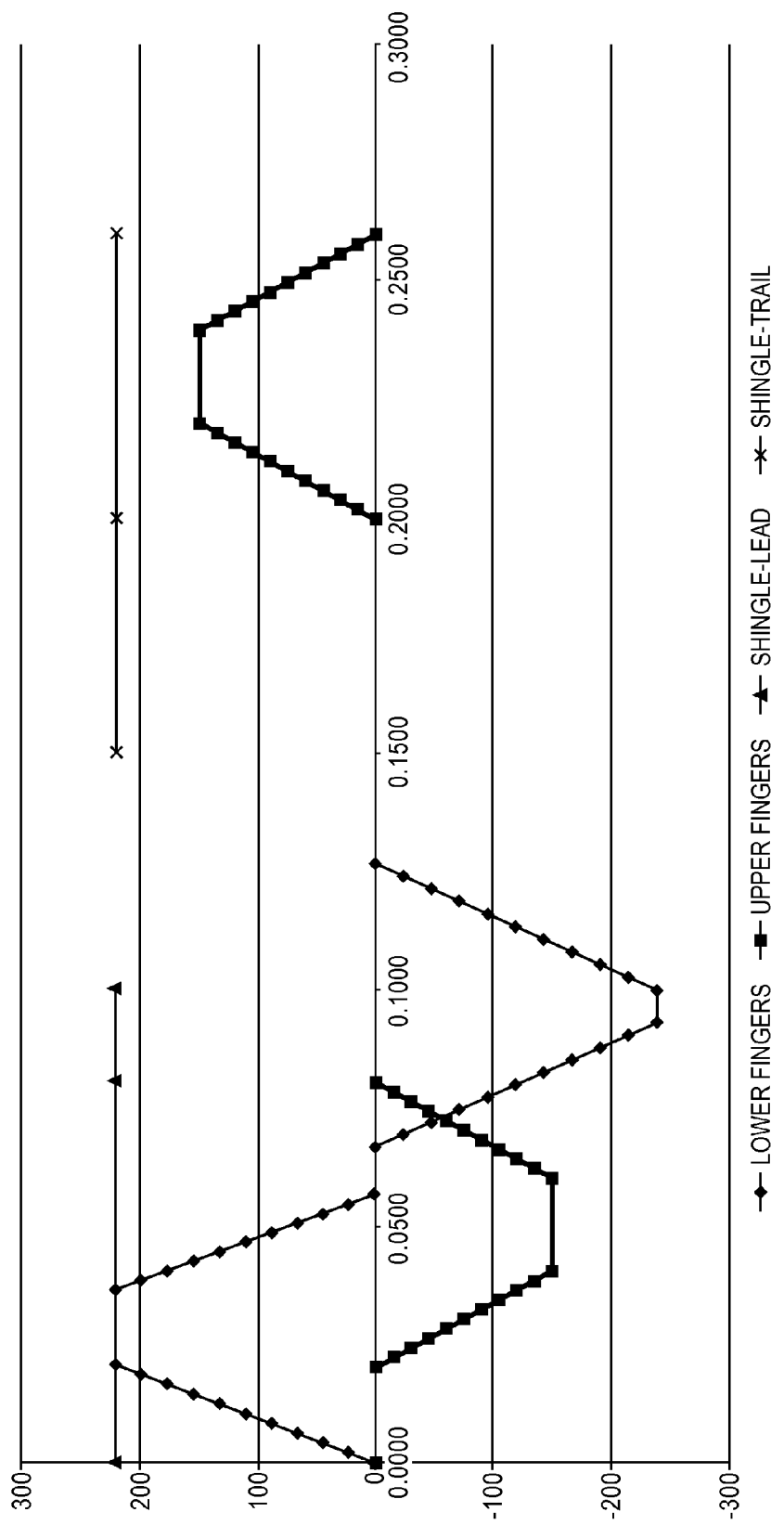
FIG. 15 is a graph showing the velocity of the first fingers (lower fingers), the second fingers (upper fingers), and the leading and trailing ends of a product against time.
Figure 16:
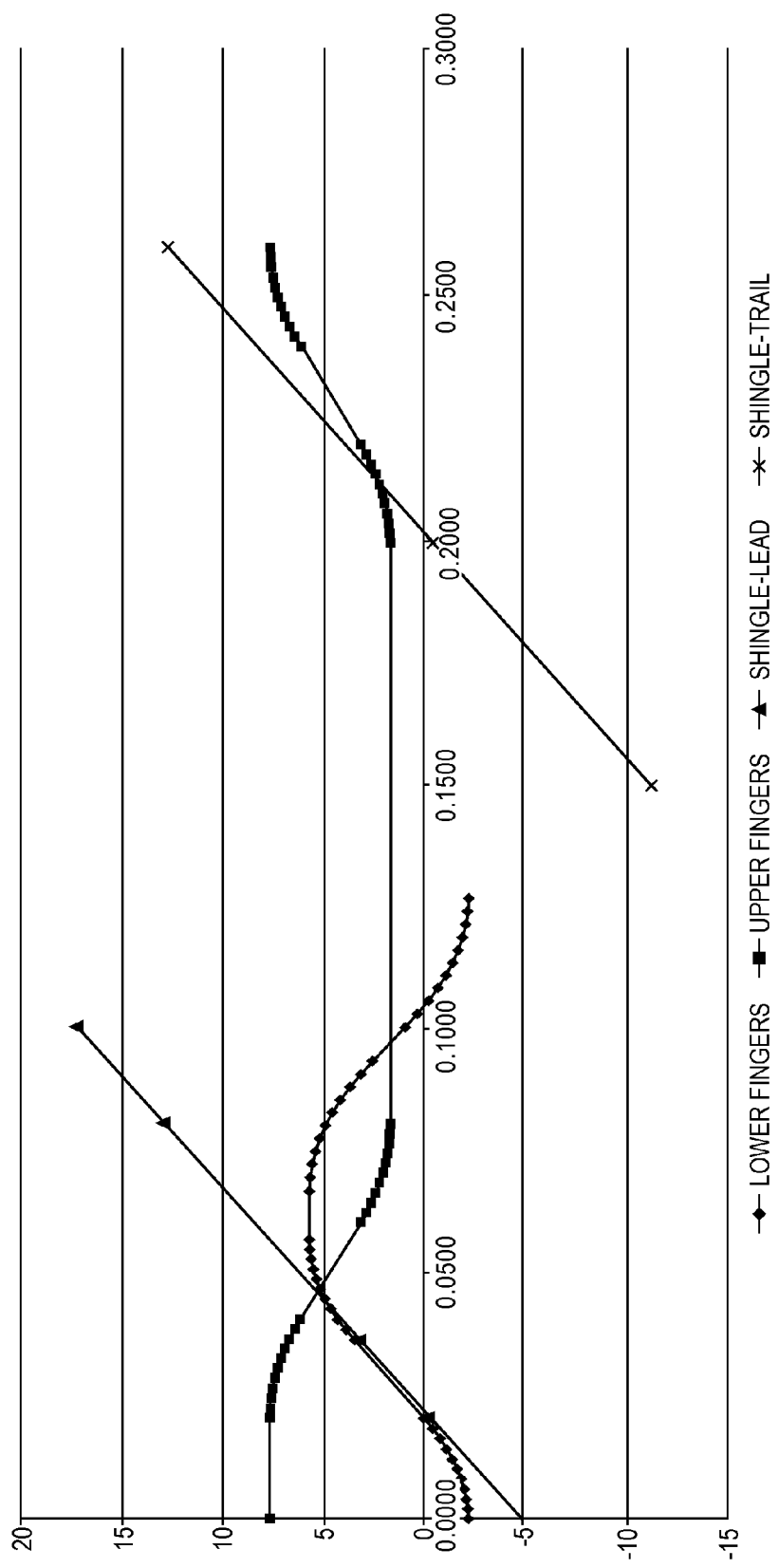
FIG. 16 is a graph of the relative positions of the outer ends of the first fingers (lower fingers), the second fingers (upper fingers), and the leading and trailing ends of the product against time.
Figure 17:
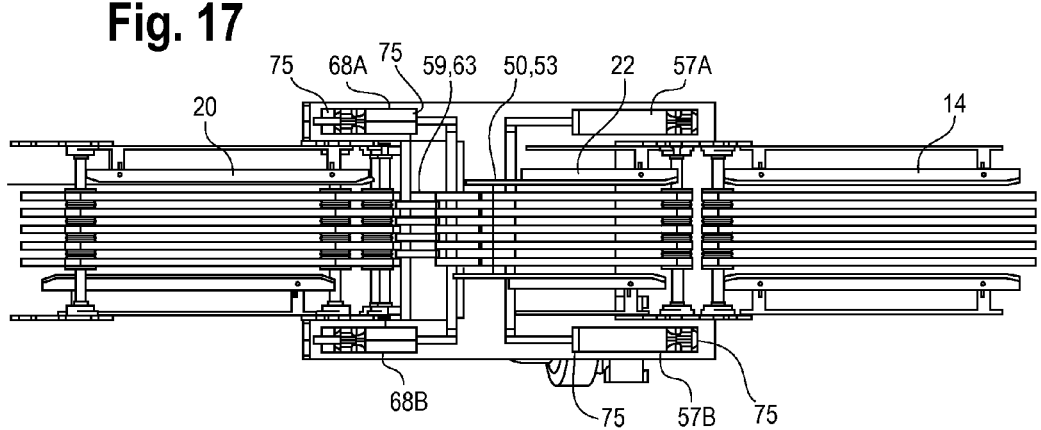
FIG. 17 is a top view of a conveyor system with a diverter in accordance with the invention showing the motors that move the first and second sets of fingers.
Figure 18:
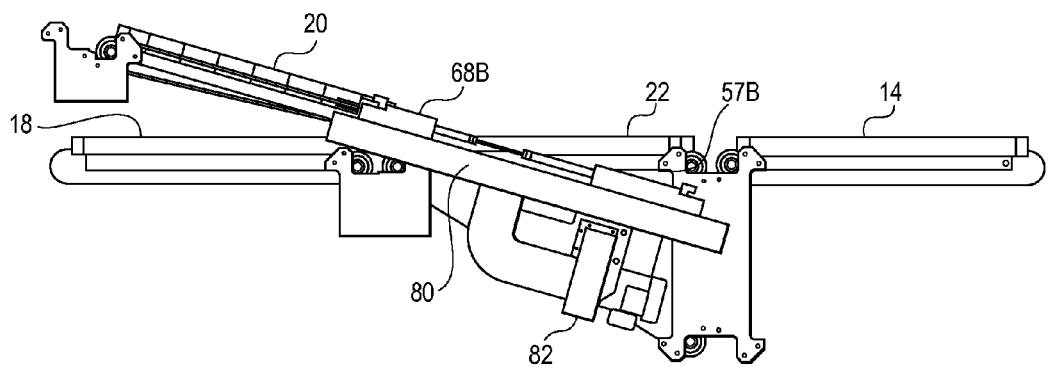
FIG. 18 is a side view of the conveyor shown in FIG. 17 with the plenum and blower visible.

Referring to FIG. 15, a graph is provided that shows the velocity of the first and second fingers against time as they move between their first position and second position in accordance with the cycle described above. Also shown is the velocity of the leading and trailing ends of the product 12. Referring to FIG. 16, the relative positions of the first and second fingers are graphed against time and with respect to the movement of the leading and trailing ends of a product member.

The diverter 16 can be operated to direct all product 12 to the primary conveyor 18 by retaining both sets of fingers 50-53 and 59-60 in their retracted positions, or can be operated to direct all product 12 to the secondary conveyor 20 by retaining both sets of fingers 50-53 and 59-63 in their extended positions.

Referring to FIGS. 5 and 17 to 20, we have found it desirable to provide pairs of servo linear motors, one pair 57A, 57B to operate the first arms 50-53 and the second pair 68A, 68B to operate the second arms 59-63 with each of the pairs electronically synchronized. Each of the linear servo motors 57A, 57B, 68A, 68B also requires a linear bearing at each end thereof. All the bearings are preferably identical and therefore all bear indicia number 75, and the location of one four of the bearings 75 are identified in FIG. 17. The bearings 75 at the ends of the motors can easily become contaminated from dust injected into the surrounding air as a result of the manufacturing process, and the contamination can result in wear to the parts and failure.

Figure 19:
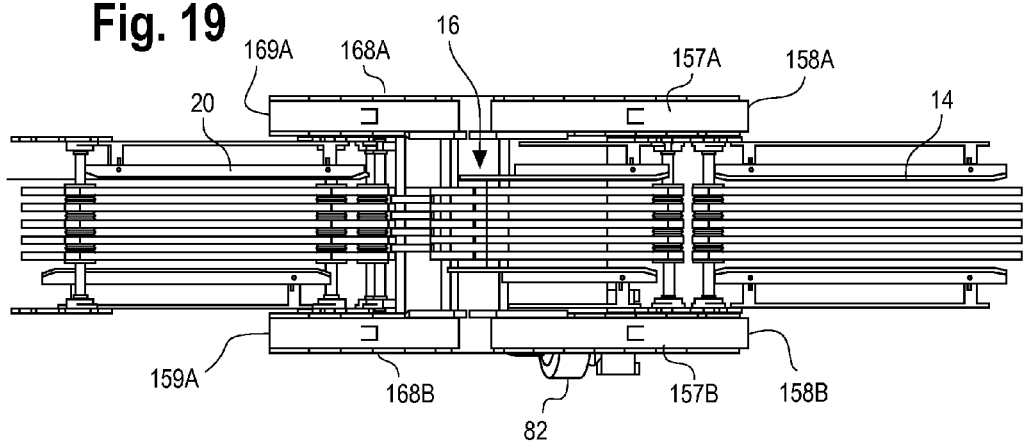
FIG. 19 is another top view of a conveyor system similar to that shown in FIG. 17 but showing enclosures surrounding the linear motors that drive the fingers.
Figure 20:
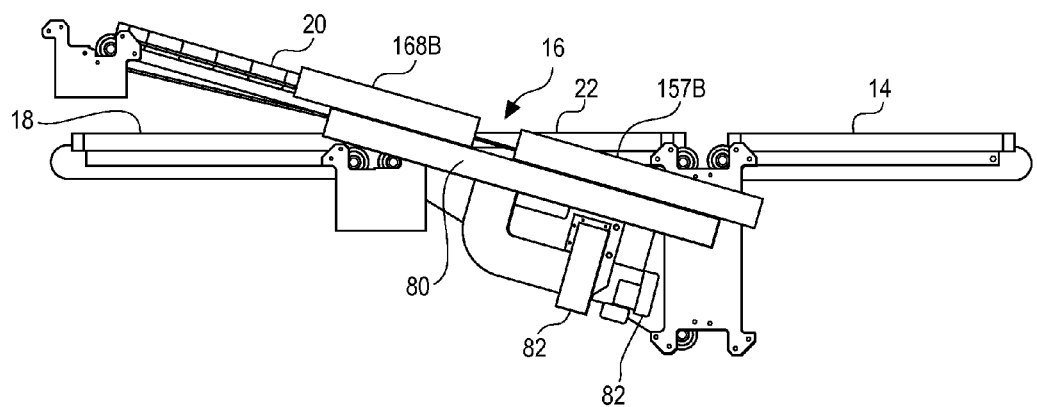
FIG. 20 is a side view of the conveyor shown in FIG. 19.

To cool the linear motors 57A, 57B, 68A, 68B and their associated linear bearings 75, a plenum 80 is provided below the motors 57A, 57B, 68A, 68B with pressurized clean air fed into the plenum 80 by a blower 82. The blower 82 draws air through a filter 85 so as to provide a clean environment within the enclosures. Alternately clean air may be drawn from outside the manufacturing environment through an input duct, not shown. Each of the motors 57A, 57B, 68A, 68B and its associated bearings 75 respectively, is enclosed in its own associated housing 157A, 157B, 168A, 168B respectively. Pressurized clean air from the plenum 80 enters one end, unnumbered, of each of the elongate housings 157A, 157B, 168A, 168B so that it passes over and cools the enclosed motor and bearing assembly and is vented out the far end through an opening 158A, 158B, 169A, 169B respectively, as shown in FIG. 19.

The blower 82, the plenum 80 and the housings 157A, 157B, 168A, 168B form non-contact air seals around the enclosed motors so as to both cool and seal the bearings and the moving parts.

While the present invention has been described with respect to a single embodiment, it will be appreciated that many modifications and variations may be made without departing from the spirit and scope of the invention. It is therefore the intent of the appended claims to cover all such modifications and variations that fall within the scope of the invention.

What is claimed:

1. A diverter for a conveyor system conveying a flexible product having a leading edge and a trailing edge, said conveyor system including a lower conveyor with an upper surface extending between upstream and downstream ends thereof, and with the upper surface of said lower conveyor defining a first plane, and an upper output conveyor arranged in vertically spaced relation relative to said lower conveyor, with said upper output conveyor having an upper surface defining a second plane which intersects with said first plane at a first angle, said diverter comprising:

a finger operably arranged between the upstream and downstream ends of said lower conveyor, with said finger having a length, an outer end, and an upper surface, with said upper surface of said finger being disposed at an angle substantially equivalent to but not greater than said first angle, with said finger being longitudinally moveable between a first position, wherein the outer end of said finger is disposed below said first plane, and a second position above said first plane wherein said outer end of said finger advances and moves through said first plane along a path of travel extending generally parallel to and substantially coplanar with said second plane, a motor for moving said finger between said first position and said second position, a detector for detecting one of said leading edge and said trailing edge of said product on said conveyor system, and a synchronizing device connected to said motor and said detector for initiating advancement of said finger from said first position before said leading edge of said first product reaches said intersection wherein said outer end deflects said leading edge toward said upper output conveyor as said outer end of said finger penetrates said first plane.

2. The diverter of claim 1 and further comprising:
a second finger having a length, an outer end and an upper surface, with the upper surface of said second finger being disposed at an angle substantially equivalent to but not greater than said first angle,
with said second finger being longitudinally moveable such that the upper surface of said second finger moves along a path of travel extending generally parallel to and in generally coplanar relation with said second plane, and with said outer end of said second finger being movable between a first position, wherein said outer end of said second finger is above said first plane, and a second position wherein said outer end of said second finger is below said first position and above said first plane.

3. The diverter of claim 2 and further comprising:
a second motor for moving said second finger between its said first position and its second position, and
with said synchronizing device being connected to said second motor, wherein said first and second fingers form a bridge when said second finger reaches its said second position and said first finger reaches its said second position.

4. The diverter of claim 2 and further comprising:
a bearing facilitating movement of one of said first and second fingers,
an enclosure around said bearing and said motor for said one of said first and second fingers,
said enclosure having a first end and a second end, and
a blower for forcing clean air into said first end and through said enclosure and out said second end for cooling said motor and for sealing said bearing.

5. The diverter of claim 4 wherein said motor is a linear motor and said bearing is a linear bearing.

6. A diverter for a conveyor system conveying products having a leading edge and a trailing edge, said conveyor system including an input conveyor, a first output conveyor, and a second output conveyor, said diverter comprising:
a member longitudinally moveable between a first position and a second position, wherein a first of said products is directed to said first output conveyor when said moveable member is in said first position and a second of said products is directed to said second output conveyor when said moveable member is in said second position,
a motor for moving said moveable member between said first position and said second position;
a bearing facilitating movement of said moveable member,
an enclosure around said motor and said bearing,
said enclosure having a first end and a second end, and
a blower for forcing clean air into said first end and through said enclosure and out said second end for cooling said motor and for sealing said bearing.

7. The diverter of claim 6 wherein said motor is a linear motor and said bearing is a linear bearing.

8. The diverter of claim 7 wherein
said first output conveyor is above said second output conveyor,
said moveable member is a longitudinally moveable finger,
said first output conveyor has an upper surface defining a first plane,
said second output conveyor has an upper surface defining a second plane, and
said first plane intersects said second plane and said intersection of planes forms an angle.

9. The diverter of claim 8 and further comprising:
a motor for moving said moveable member between first and second positions,
a detector for detecting one of the leading edge and the trailing edge of one of said products on said conveyor system, and
with a synchronizing device being connected to said motor and said detector for initiating advancement of said moveable member from said first position before said leading edge of one of said products reaches said intersection, wherein said moveable member deflects said leading edge toward said upper conveyor as said moveable member penetrates said first plane.

10. The diverter of claim 9 and further comprising:
a second moveable member having a length, an outer end and an upper surface disposed at an acute angle relative to said first plane,
with said second moveable member being longitudinally moveable such that the upper surface of said second member moves along a path extending substantially coplanar with and generally parallel to said second plane, and
with an outer end of said second moveable member being moveable between a first position, wherein said outer end of said second moveable member is above said first plane, and a second position wherein said outer end of said second moveable member is below said first position and above said first plane.

11. The diverter of claim 10 and further comprising:
a second motor for moving said second moveable member between its first position and its second position, and
with said synchronizing device being connected to said second motor, wherein movement of said first and second moveable members are synchronized to form a bridge to divert said second of said products to said second output conveyor when both said first and said second moveable members are in their respective second positions.

12. A diverter for a conveyor system conveying product having a leading edge and a trailing edge, said conveyor system including an input conveyor, a first output conveyor, and a second output conveyor, said diverter comprising:
a first plane extending between said input conveyor and said first output conveyor,
a first moveable member longitudinally movable between a first position and a second position,
a second moveable member above said first moveable member,
with said second moveable member being longitudinally moveable between a first position and a second position, wherein a first of said product is directed to said first output conveyor when said first and second moveable members are both in their respective first position, and with said first and second moveable members forming a bridge when in their respective second position, said bridge directing a second of said product to said second output conveyor, a motor for moving one of said first moveable member and said second moveable member between its said first position and its said second position,
a bearing facilitating movement of said one of said first and second moveable member,
an enclosure around said bearing and said motor,
said enclosure having a first end and a second end, and
a blower for forcing air into said first end through said enclosure and out said second end for cooling and sealing said bearing and said motor.

* * * * *